United States Patent
Lang

(10) Patent No.: US 9,676,672 B2
(45) Date of Patent: Jun. 13, 2017

(54) MULTI-SEGMENTED STRUCTURED CERAMIC PACKING

(76) Inventor: Ko C. Lang, Agoura Hills, CA (US)

( * ) Notice: Subject to any disclaimer, the term of this patent is extended or adjusted under 35 U.S.C. 154(b) by 281 days.

(21) Appl. No.: 14/342,516

(22) PCT Filed: Aug. 30, 2012

(86) PCT No.: PCT/US2012/053187
§ 371 (c)(1),
(2), (4) Date: Mar. 3, 2014

(87) PCT Pub. No.: WO2013/036435
PCT Pub. Date: Mar. 14, 2013

(65) Prior Publication Data
US 2014/0212622 A1 Jul. 31, 2014

Related U.S. Application Data

(60) Provisional application No. 61/531,193, filed on Sep. 6, 2011, provisional application No. 61/577,044, filed on Dec. 18, 2011.

(51) Int. Cl.
*F28F 21/04* (2006.01)
*C04B 38/00* (2006.01)
(Continued)

(52) U.S. Cl.
CPC ........ *C04B 38/0009* (2013.01); *B01D 46/247* (2013.01); *B01D 46/2466* (2013.01); *C04B 38/0019* (2013.01); *F28F 21/04* (2013.01); *C04B 2111/0081* (2013.01); *C04B 2111/00793* (2013.01); *F01N 3/0222* (2013.01); *F01N 3/2828* (2013.01); *F01N 13/0097* (2014.06); *F01N 2330/06* (2013.01); *F01N 2330/30* (2013.01); *F01N 2330/48* (2013.01);
(Continued)

(58) Field of Classification Search
None
See application file for complete search history.

(56) References Cited

U.S. PATENT DOCUMENTS

| | | | | |
|---|---|---|---|---|
| 2,608,828 A * | 9/1952 | Dimick | ................ | E02B 11/005 405/47 |
| 3,133,753 A * | 5/1964 | Goodman | ............... | F16L 39/00 138/106 |
| 3,329,271 A * | 7/1967 | Ward | ................... | B01D 23/005 156/296 |
| 4,382,046 A * | 5/1983 | Frohwerk | ................. | F28F 7/02 261/94 |
| 5,436,042 A * | 7/1995 | Lau | ......................... | C04B 35/80 264/28 |
| 5,531,593 A * | 7/1996 | Klobucar | ............. | F27D 17/008 110/211 |
| 5,755,569 A * | 5/1998 | Berg | ................... | B01J 19/2485 165/9.1 |

(Continued)

*Primary Examiner* — David Sample
*Assistant Examiner* — Nicholas W Jordan
(74) *Attorney, Agent, or Firm* — Melanius D'Souza

(57) ABSTRACT

A multi-segmented monolith (MSM) which can be used as a structured packing in mass-transfer and catalytic operations is disclosed. The MSM comprises a series of longitudinally attached segments. The length of each segment is between 0.2 to 5 inches. Each segment has flow passages which extend from the inlet flow face to the outlet flow face. The segments are located such that the outlet of a flow passage on a segment is in flow communication with the inlet of a flow passage on an adjacent attached segment. The segments are attached to each other either in the green state or with an adhesive, such as sodium silicate. Alternately, the segments are attached to each other by a mechanical means, such as a tie-rod or a dowel pin. The MSM further includes a spacer means between adjacent segments. A plurality of MSMs are further assembled into a Compound MSM (CMSM).

11 Claims, 8 Drawing Sheets

(51) Int. Cl.
    *B01D 46/24*    (2006.01)
    *F01N 3/022*    (2006.01)
    *F01N 3/28*     (2006.01)
    *F01N 13/00*    (2010.01)
    *C04B 111/00*   (2006.01)
    *F28F 7/02*     (2006.01)
    *F28D 17/02*    (2006.01)
    *F28D 19/04*    (2006.01)

(52) U.S. Cl.
    CPC .............. *F28D 17/02* (2013.01); *F28D 19/04* (2013.01); *F28F 7/02* (2013.01); *Y10T 428/24149* (2015.01)

(56) References Cited

U.S. PATENT DOCUMENTS

| | | | | |
|---|---|---|---|---|
| 5,851,636 | A * | 12/1998 | Lang | C04B 38/0003 428/172 |
| 6,241,222 | B1 * | 6/2001 | Lang | F28F 21/065 261/94 |
| 8,192,832 | B1 * | 6/2012 | Lang | B32B 3/02 428/167 |
| 2005/0138907 | A1 * | 6/2005 | Jobson | F01N 3/0222 55/523 |

* cited by examiner

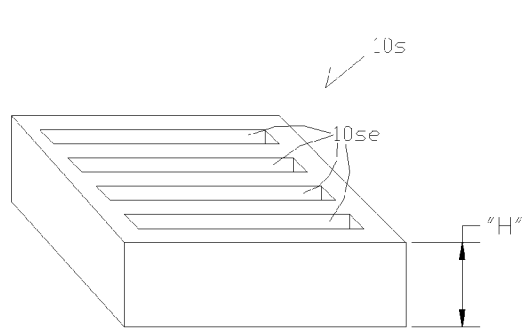
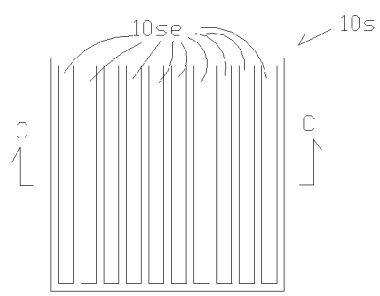
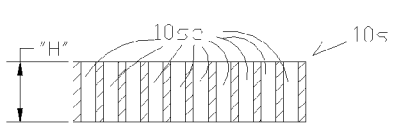
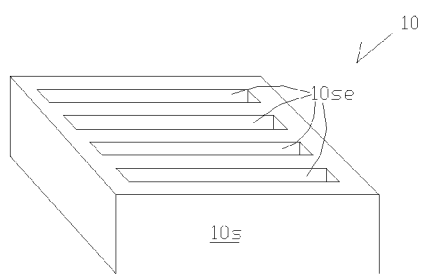
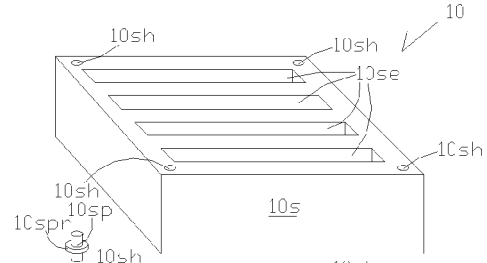
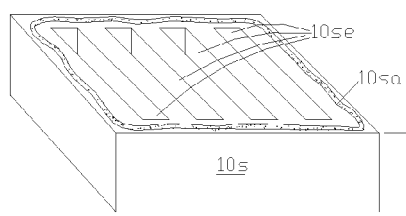
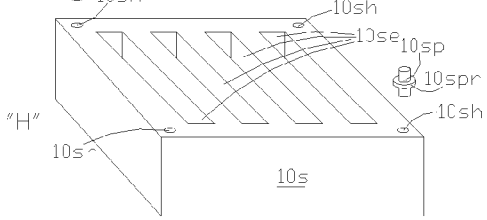

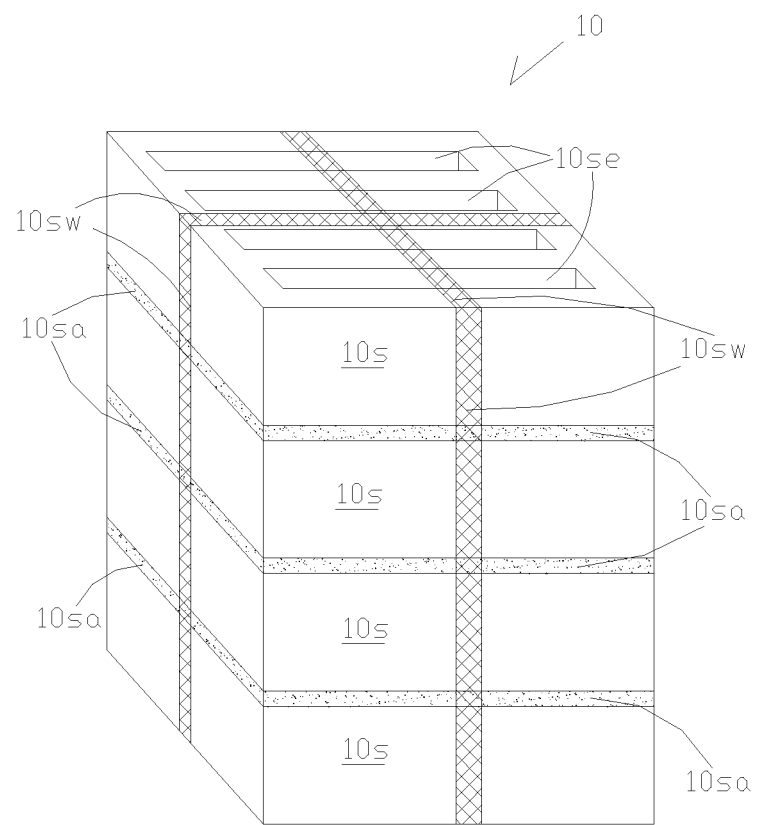
Fig. 9
(New)

MULTI-SEGMENTED STRUCTURED CERAMIC PACKING

CROSS-REFERENCE TO RELATED APPLICATIONS

This application claims priority from U.S. Provisional Applications Nos. 61/531,193 filed on Sep. 6, 2011 and 61/577,044 filed on Dec. 18, 2011.

FIELD OF THE INVENTION

This disclosure relates generally to ceramic structured (or monolith) packing for use as heat-sink media in regenerative heat-exchangers or as a catalyst carrier for purifying exhaust gases or as a filter for particulate laden hot gases.

BACKGROUND

Ceramic structured packings are honeycombed structures which are formed by an extruding or injecting method. The packings have a plurality of passages extending there through. The typical unit cross section of the passages has a shape of a regular square, a regular triangle, a hexagon, or the like. Such structures have been found to have a directional quality in mechanical strength.

Traditional structured packing generally have square flow passages (with an aspect ratio equal to one) or circular flow passages or rectangular flow passages or triangular flow passages. Details of such traditional structured packing are available from the websites of manufacturers such as lantecp.com, rauschert.com, ceram.fraunthel.com, and others.

Ceramic structured packings are well described in prior art patents such as U.S. Pat. No. 4,233,351 to Okumura, et al. They are generally manufactured as elongated ceramic blocks having a square cross-section with through longitudinal flow passages for the flow of gas there-through. Generally the blocks are about 2 inches by 2 inches to 6 inches by 6 inches in cross-section and about 2 to 12 inches in length. The dimensions of the blocks are limited by the thermal stress which the "green" (non-fired clay) blocks experience when they are fired to be converted to a ceramic state. The thermal stress may cause some of the blocks to break thereby reducing the product yield of the manufacturing process. Some of the blocks may also break when subjected to the high thermal stress in Regenerative Heat Exchangers. The problems due to thermal stress are described in Okumara et al.

To increase the product yield, special compounds such as Aluminum Oxide are added to the clay to reduce the thermal stress during the firing stage of the process. However, the special compounds add greatly to the cost of the final product. There is therefore a need for a process for making less expensive ceramic structured packing from ordinary clay.

Described herein is a process for making a ceramic structured packing from ordinary clay or less expensive ceramic composites without the use of expensive compounds to reduce thermal stress. The ceramic structured packing described herein has better resistance to thermal stress. Thereby manufacturing yield is increased and breakage during use is also reduced.

The process provides an improved ceramic structured packing which has an excellent mechanical strength and thermal shock resistance. The improved ceramic structured packing is suitable for use in a catalyst carrier for purifying exhaust gases, or as a heat storage media in a regenerative heat exchanger or as a filter for removing particulate matter from a hot gas.

Other advantages of the improved ceramic structured packing will become apparent from the following description of embodiments with reference to the accompanying drawings herein.

SUMMARY

In one embodiment of the invention, a Multi-Segmented Monolith (MSM) comprises a series of longitudinally attached segments. Each segment has external non-flow surfaces and an inlet flow face and an outlet flow face. The outlet flow face is generally parallel to and located at a distance of between 0.2 to 5 inches from the inlet flow face. A plurality of fluid flow passages extend from the inlet flow face to the outlet flow face. The segments are located such that the outlet of a flow passage on a segment is in flow communication with the inlet of a flow passage on an adjacent attached segment. The segments are attached to each other either in the green state or with an adhesive, such as sodium silicate. The MSM further includes a spacer means between adjacent segments. Alternately, the segments are attached to each other by a mechanical means, such as a tie-rod or dowel pin, which has a spacer section to provide the gap between two adjacent segments. The flow passages in the MSM are polygonal in cross-section with at least three sides. Alternately, the flow passages are U-shaped in cross-section. Alternately, the flow passages have internal ribs. Alternately, the flow passages are serpentine in cross-section.

A plurality of MSMs are assembled into a Compound MSM (CMSM) by being attached to each other at their outer surfaces with their flow passages generally oriented in the same direction. The MSMs could be attached in a green state or with an adhesive such as sodium silicate or by a mechanical means such as a dowel pin or a tie-rod or a wrap. The wrap could be metal or plastic.

In another embodiment of the invention, a process for making a MSM comprises the steps of homogenizing raw clay and extruding the homogenized raw clay in an extruder to produce the MSM segments described above. The segments are then attached to each other such that the outlet of a flow passage on a segment is in flow communication with the inlet of a flow passage on an adjacent attached segment.

In yet another embodiment of the invention, the process for making a CMSM as described comprises the further step of attaching a plurality of MSMs made according to the above described process at their outer non-flow surfaces with their flow passages generally oriented in the same direction.

BRIEF DESCRIPTION OF THE DRAWINGS

FIG. 1a is an isometric representation of a segment of the Multi-Segmented Monolith (MSM) disclosed herein. The segment has elongated rectangular flow passages.

FIG. 1b is a plan-view representation of the segment shown in FIG. 1a.

FIG. 1c is a longitudinal cross-sectional representation of the segment shown in FIGS. 1a and 1b.

FIG. 2a is an isometric exploded-view representation showing the assembly of two segments of FIG. 1a to assemble the Multi-Segmented Monolith disclosed herein. The assembly uses a adhesive for joining the segments together to form the MSM.

FIG. 2b is another isometric exploded-view representation showing the assembly of two segments of FIG. 1a to assemble the Multi-Segmented Monolith disclosed herein. The assembly uses dowel holes and dowel pins for joining the segments together to form the MSM.

FIG. 3a is an isometric representation of the assembled Multi-Segmented Monolith disclosed herein using the segments of FIG. 1a.

FIG. 3b is a cross-sectional elevation view representation of the assembled Multi-Segmented Monolith of FIG. 3a.

FIG. 4b is a plan-view representation of the segment of FIG. 4a.

FIG. 9 is an isometric view representation of a plurality of MSMs which are bundled using a Mesh wrap to provide a composite MSM.

DETAILED DESCRIPTION OF PREFERRED EMBODIMENTS

As defined herein:

A "structured packing" is a structure which has flow-passages for the through passage of a fluid to effect heat transfer between the fluid and the structure material or a catalytic reaction on the surfaces of the flow passages.

A "segment" is a thick layer of ceramic having generally parallel flow faces and flow passages extending from the inlet flow face to the outlet flow face.

A "Multi-Segmented Monolith (MSM)" is a structured packing made by attaching a series of segments, such that the outlet of a flow passage on a first segment is in flow communication with the inlet of a flow passage on an adjacent attached segment.

A "Compound MSM (CMSM)" is a structured packing made by attaching a plurality of MSMs along their external non-flow surfaces with their flow passages generally oriented in the same direction.

FIGS. 1a, 1b, and 1c represent a segment 10s of the Multi-Segmented Monolith 10 disclosed herein. The segment has a square cross-section with a plurality of flow passages 10se. The segments can be from 1 to 12 inches square in cross-section and have a height "H" of between 0.2 inch to 5 inches. As shown in the plan-view representation of segment 10s in FIG. 1b, the flow passages 10se have a elongated rectangular flow cross-section. Further shown in the elevation-view representation of segment 10s in FIG. 1c, flow passages 10se extend longitudinally through height "H" of segment 10s. The process of making segment 10s is described in subsequent paragraphs.

FIG. 2a is an isometric exploded representation of two of the segment 10s shown in FIG. 1a in the process of being assembled into Multi-Segmented Monolith 10. As shown in FIG. 2a, the two segments are arranged such that flow passages 10se on first segment 10s are at right angles to flow passages 10se on second segment 10s. The crossing of the flow passages on the two segments is intended to break up the boundary layer of the fluid flowing through the passages and thereby increase the heat transfer between the fluid and the solid. As shown in FIG. 2a, an adhesive 10sa can be applied between the flow-face surfaces of adjacent segments 10s to join the segments together to form MSM 10. Any suitable commercially available ceramic adhesive can be used to join the segments together. For example, a ceramic adhesive such as sodium silicate can be used as adhesive 10sa. Yet other adhesives, such as a non-ceramic adhesive, which are suitable for the operating conditions of MSM 10 may also be used.

Alternately other physical means of holding the segments together can be practiced. For example, as shown in FIG. 2b, dowel holes 10sh can be provided in segments 10s and ceramic dowel pins 10sp can be inserted in dowel holes 10sh to join segments 10s together to form MSM 10. Dowel pins 10sp can be used with or without ceramic adhesive 10sa. As shown in FIG. 2b, a protrusion 10spr is provided on dowel pin 10sp to create a peripheral gap between adjacent segments 10s.

Figure 3A:
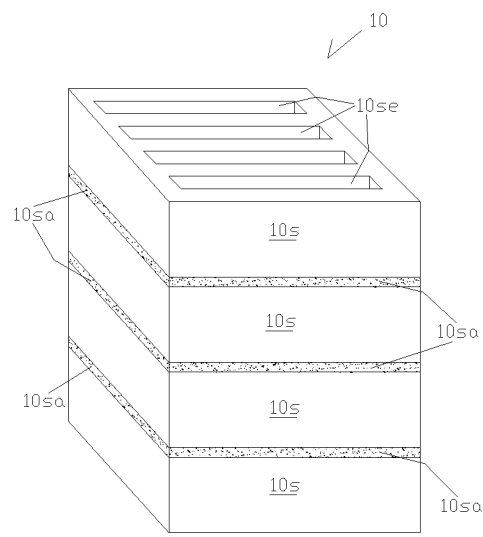

FIG. 3a shows a plurality of segments 10s which are stacked and joined together by adhesive 10sa to produce MSM 10.

Figure 3B:
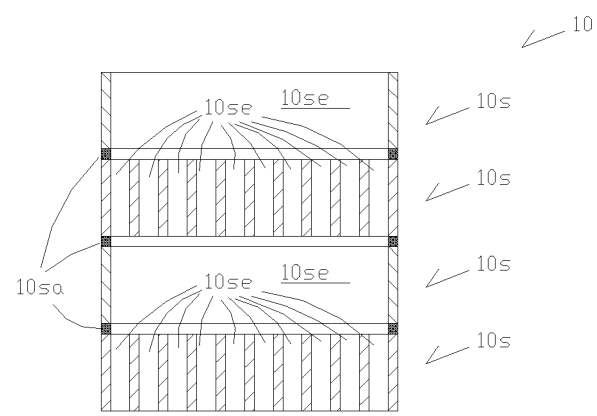

FIG. 3b shows a cross-sectional elevation view representation of MSM 10 of FIG. 3a. As shown in FIG. 3b, the cross-location of elongated slots 10se creates contraction and expansion zones which cause turbulence which is generally known to increase the rate of heat transfer between solids and fluids. Alternately, elongated slots 10se can be aligned (not shown) to provide an unobstructed straight-through flow passage through MSM 10. This may be a suitable configuration for situations where laminar flow is desired in MSM 10.

Figure 4A:
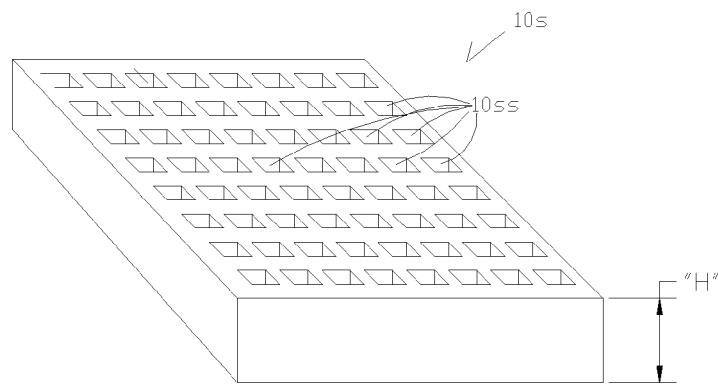
FIG. 4a is an isometric representation of an alternate configuration of the segment of the Multi-Segmented Monolith disclosed herein. The segment has square flow passages.
Figure 4B:
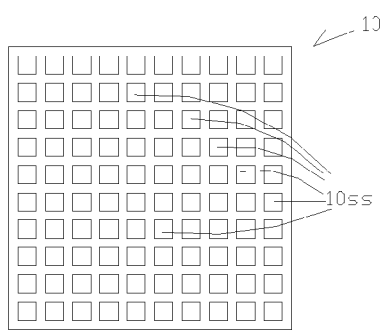
Figure 4C:
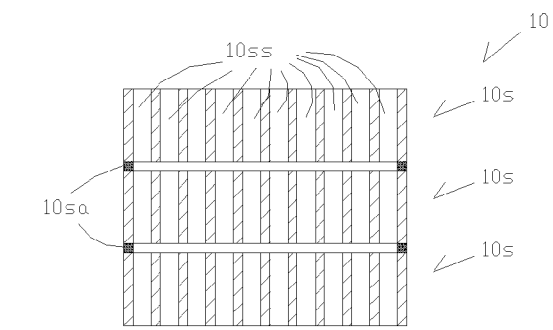
FIG. 4c is a cross-sectional elevation view representation of a Multi-Segmented Monolith assembled from the segments shown in FIG. 4a. The flow passages in the segments are in-line to create a straight flow path through the MSM.

FIGS. 4a, 4b, and 4c are isometric, plan-view, and cross-sectional elevation-view representations respectively of an alternate configuration of segment 10s wherein flow passages 10ss are square in cross-section. As shown in FIG. 4c, flow passages 10ss are congruently located to provide straight-through flow passages through MSM 10.

Figure 4D:
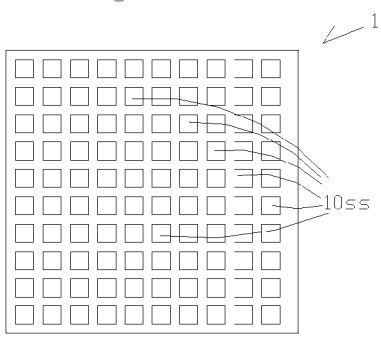
FIG. 4d is a plan-view representation of an alternate configuration of the segment of the Multi-Segmented Monolith disclosed herein. The segment is slightly rectangular and has square flow passages, which are slightly offset, from the center of the cross-section of the segment.
Figure 4E:
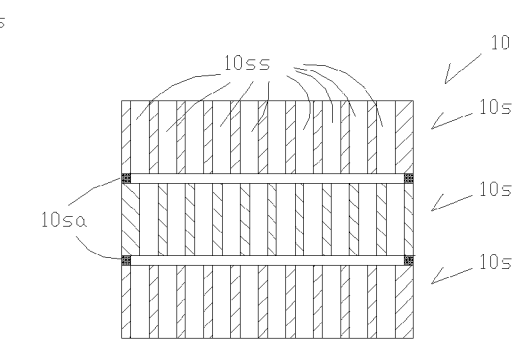
FIG. 4e is a cross-sectional elevation view representation of the segment of the Multi-Segmented Monolith shown in FIG. 4d. The flow passages in the segments are offset to create a slightly serpentine flow path through the MSM.

Alternately flow passages 10ss can be located in an offset arrangement to provide stepped flow passages through MSM 10. The stepped flow-passages will break the boundary layer of the fluid to create turbulence and thereby increase the rate of heat transfer. FIG. 4d shows a plan-view representation of a segment 10s which is slightly rectangular in cross-section and has square flow passages 10ss which are slightly offset from the center of the cross-section of the segment. When the second segment is flipped over or rotated 180 degrees and placed on top of the first segment, a slightly serpentine flow path is created as shown in FIG. 4e. The serpentine flow path creates turbulence which increases the rate of heat transfer in MSM 10.

Alternately (not shown), the segment can be square in cross-section and the rows of flow-passages can be slightly offset from the center of the segment. When a second square segment with offset rows of flow-passages is flipped over or rotated 180 degrees and placed on top of a similarly constructed first segment, a slightly serpentine flow path is created.

Figures 4F, 4G:
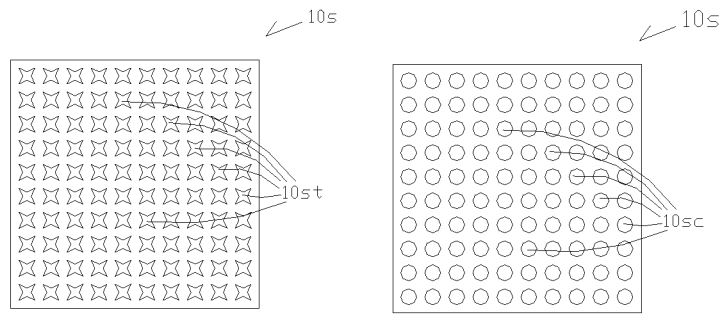
FIG. 4f is a plan-view representation of an alternate configuration of the segment of the Multi-Segmented Monolith disclosed herein. The segment has star-shaped flow passages.
FIG. 4g is a plan-view representation of yet another alternate configuration of the segment of the Multi-Segmented Monolith disclosed herein. The segment has circular flow passages.
Figures 4H, 4I:
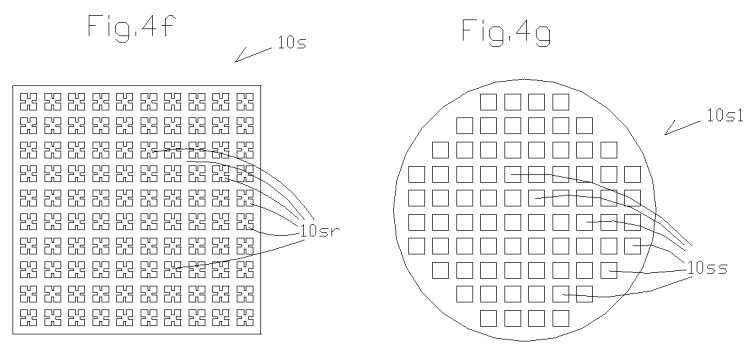
FIG. 4h is a plan-view representation of yet another alternate configuration of the segment of the Multi-Segmented Monolith disclosed herein. The segment has square flow passages with internal ribs.
FIG. 4i is a plan-view representation of yet another alternate configuration of the segment of the Multi-Segmented Monolith disclosed herein. The segment has a circular cross-section with square flow passages.
Figure 4J:
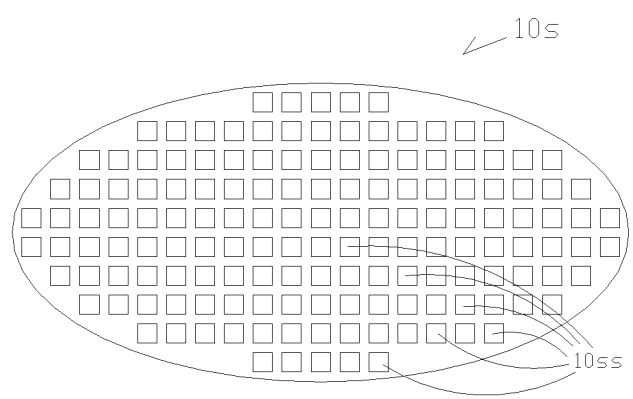
FIG. 4j is a plan-view representation of yet another alternate configuration of the segment of the Multi-Segmented Monolith disclosed herein. The segment has an elliptical cross-section with square flow passages.
Figure 4K:
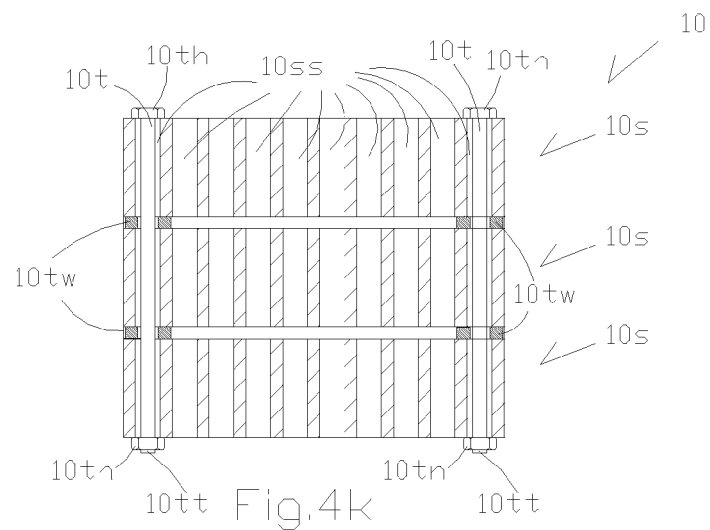
FIG. 4k is a cross-sectional elevation view representation of a Multi-Segmented Monolith assembled from the segments shown in FIG. 4a using tie-rods. Washers are used to create gaps between adjacent segments.

In another alternate arrangement shown in the cross-sectional elevation view representation of FIG. 4k, a plurality of Multi-Segmented Monoliths 10s are assembled into MSM 10 using threaded metallic tie-rods 10t. Tie-rod 10t is configured as a long bolt with a bolt-head 10th and threaded end 10tt. Tie-rod 10t is threaded through segments 10s and is held in place with nut 10tn at its threaded end 10tt. Metallic or ceramic washers 10tw are located between adjacent segments 10s to create gaps between the adjacent segments. The flow passages in segments 10s can be in-line or off-set as described previously.

Yet other configurations and shapes for the segments and the flow-passages will be obvious to persons having ordinary skill in the art. Flow passages with other cross-sectional shapes such as circular or polygonal (such as triangular, square, rectangular, pentagonal, hexagonal, heptagonal, hexagonal, etc.) can be used also in an in-line or offset configuration as described above. For example, FIG. 4f shown a plan-view representation of segment 10s which has star-shaped flow passages 10st.

As another example, FIG. 4g shows a segment 10s which has circular flow passages 10sc.

As yet another example, FIG. 4h shows segment 10s which has square flow passages with internal ribs 10sr.

As yet another example, FIG. 4i shows segment 10s1 which has a circular cross-section with square flow passages 10ss.

As yet another example, FIG. 4j shows segment 10s2 which has an elliptical cross-section with square flow passages 10ss.

From the above examples, it will be obvious that the process can be practiced to make MSM segments which have any other suitable cross-section. For example, the homogenized raw clay can be extruded in various cross-sections for example, a rectangular, or circular or elliptical or hexagonal or any other desired cross-section. Further, the cross-sections of the flow-passages could have any suitable geometry such as circular or elliptical or triangular or hexagonal or star as required to provide the desired heat transfer or catalytic performance. Further, the flow passages could have internal ribs or other boundary layer disturbing features to enhance heat transfer.

Figure 5:
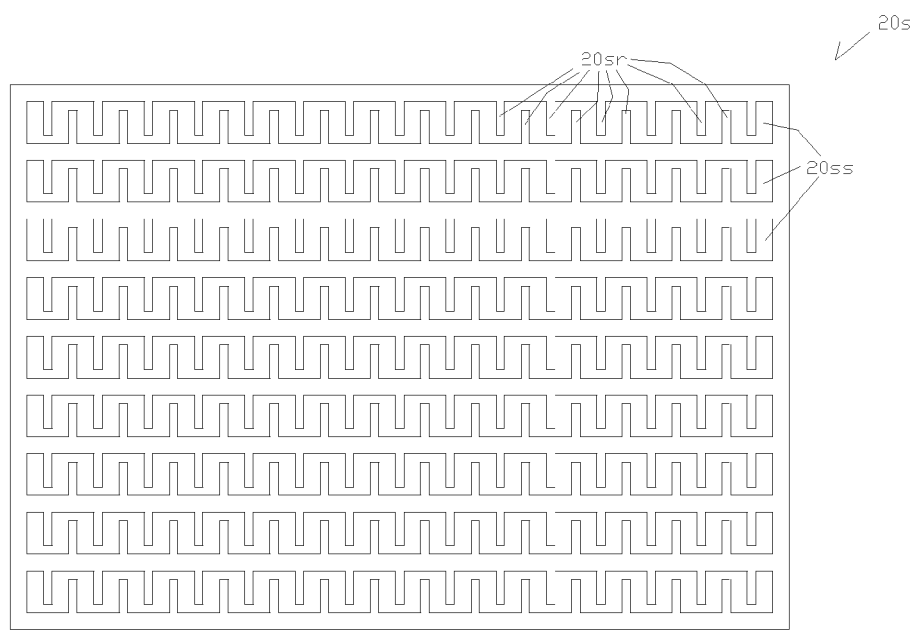
FIG. 5 is a plan-view representation of an alternate configuration of the segment of the Multi-Segmented Monolith disclosed herein. The segment has elongated rectangular flow passages with interleaved internal ribs.

As an example of internal ribs, FIG. 5 is a plan-view representation of an alternate configuration of the segment 20s which can be assembled into a Multi-Segmented Monolith. Segment 20s has elongated rectangular flow passages with interleaved internal ribs 20sr. The interleaving of ribs 20sr creates a serpentine cross-sectioned flow channel 20ss. Yet other configurations and arrangements will be obvious to persons having ordinary skill in the art.

Figure 6:
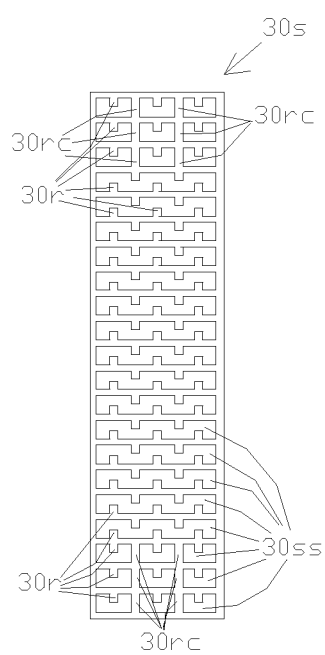
FIG. 6 is a plan-view representation of an alternate configuration of the segment of the Multi-Segmented Monolith disclosed herein wherein closed flow passages provide additional structural strength to the serpentine flow passages described in FIG. 5.
Figure 7:
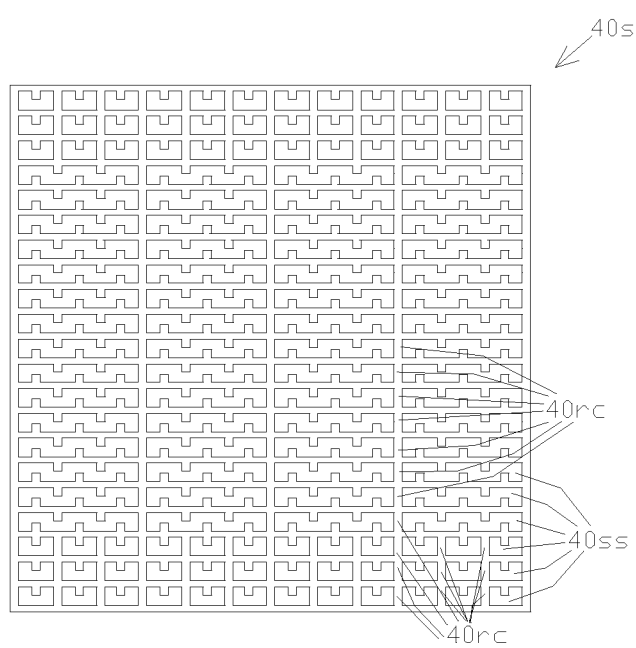
FIG. 7 is another alternate configuration of the segment of the Multi-Segmented Monolith disclosed herein wherein closed flow passages provide additional structural strength to the serpentine flow passages of the Multi-Segmented Monolith described in FIG. 5.

For example, it may be necessary for design, structural strength, and/or manufacturing reasons to have some closed flow passages together with the serpentine flow passages described above for segment 20s in FIG. 5. FIGS. 6 and 7 are cross-sectional plan representations of such configurations wherein the closed flow passages provide additional structural strength to the serpentine flow passages. For example in the MSM segment 30s of FIG. 7, some of the internal ribs 30r in the peripheral flow passages 30ss are extended to form connecting ribs 20rc to provide additional strength to segment 30s.

Figure 8:
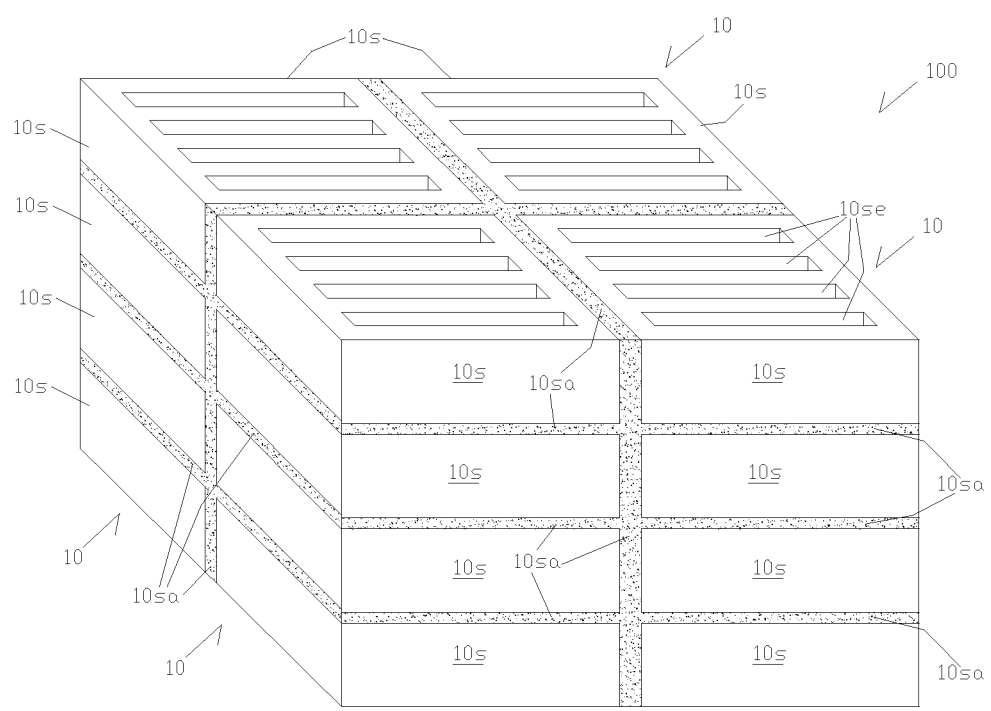
FIG. 8 is an isometric view representation of a plurality of MSMs which are assembled side by side using an adhesive to provide a composite MSM.

As another example in the MSM segment 40s of FIG. 8, some of the internal ribs 40r in the peripheral and central flow passages are extended to form connecting ribs 40rc to provide additional strength to segment 40s.

The process of making the MSM segments begins with the homogenization of raw clay using methods which are commonly used in the ceramic industry. During the homogenization process, certain additives may be added to provide the required properties for down-stream processing of the clay into MSM segments. The homogenization and compounding techniques are not described in detail as they are well known to persons skilled in the art of converting raw clay to ceramic. The composition and metallurgical properties of the processed clay are chosen to provide the required physical and thermal characteristics of the finished structured packing after firing of the green product in a kiln. The know-how for manufacturing the segments is therefore considered to be within the knowledge base of one of ordinary skill in the art and hence is not detailed herein.

The homogenized clay is then extruded as a continuous log with the cross-sectional configurations shown in the above-described figures or other similar configurations. The extruded log is cut to height "H" to provide green MSM segments having configurations shown for segments 10s, 20s, 30s, and 40s described above or other suitable non-described but obvious configurations. The green MSM segments are first air-dried and later fired in a kiln to convert the raw clay to ceramic MSM segments. Ceramic MSM segments are assembled by hand or machine into the MSM (for example MSM 10 or MSM 20 or MSM 30 or MSM 40 or other non-described MSM) using methods described previously such as adhesive 10sa or tie-rods 10t or dowel pins 10sp or both adhesive 10sa and dowel pins 10sp. It will be obvious to persons skilled in the art that other mechanical means of assembly such as plastic ties or steel wire could be used also to assemble the MSM segments in to the MSM. The assembled MSM may be further air-dried or subjected to heat-treatment depending on the kind of ceramic or non-ceramic adhesive used.

The assembly of the MSM from the segments as described above is expected to result in lower thermal stress in the MSM compared to conventionally produced one-piece structured packings. It is well known that thermal expansion and contraction is lower in a shorter and/or smaller structural element such as a MSM segment than in a long structural element such as a conventional structured packing. The reduced thermal expansion and contraction in the shorter and/or smaller structural element will therefore result in lower thermal stress which in turn will reduce the possibility that the shorter and/or smaller structural element will break. Thus the MSM segments are highly unlikely to break due to thermal stress compared to conventional structured packing. Furthermore, since the MSM is made of articulated segments which can move in different directions to accommodate thermal expansion and contraction, the overall thermal stress is diffused over the entire volume of the MSM rather than being concentrated in localized spots as in a conventional structured packing. The diffusion of the thermal stress further reduces the possibility that the MSM will break when subjected to high temperatures. Therefore, the MSM segments described herein can be made of ordinary clay or less expensive ceramic composites without the use of expensive compounds to reduce thermal stress.

Further processing means which are well-known in the catalytic arts can be practiced to coat ceramic MSM 10 with catalyst for use in catalytic converters and other catalytic applications.

Further as shown in FIG. 8, a plurality of MSM 10 can be assembled side by side to provide a composite MSM 100. The larger size of the composite MSM 100 greatly reduces the labor required to install the ceramic structured packing in large equipment such as in regenerative heat exchangers and large catalyst beds. Again because composite MSM 100 is made of segmented MSMs 10, the overall thermal stress as discussed above is likely to be much less than in conventional structured packings Thus the breakage experienced by composite MSM 100 during its use in high temperature applications is likely to be much less than that experienced by conventional structured packing.

The CMSM can be assembled when the individual MSMs are in a green state. Alternately, the CMSM can be assembled by applying an adhesive such as sodium silicate to the fired MSMs. Alternately, the individual MSMs can be attached to each other with mechanical means such as dowel pins or tie-rods or by wrapping with a plastic or a steel mesh as shown in FIG. 9.

Yet other refinements and modification of the MSM segments and the process of the making MSM segments and the MSM and the composite MSM as described above will be obvious to one of ordinary skill in the art. It is also not necessary that each segment that is assembled into the MSM should have the same cross-sections for the flow passages. An MSM could have segments which have different cross-section for the flow passages—for example, first MSM segment could have square flow passages, second MSM segment could have circular flow passages, third MSM segment could have triangular flow passages, and so forth.

It is also a good design feature to add a spacer means between the segment such that there is a gas-expansion space between the MSM segments in the MSM. For example, the dowel pins 10sp in FIG. 2b can be designed with a spacer section to separate segments 10s to create the space between adjacent segments 10s. Alternately, dowel pin 10sp could be longer than the combined depth of the dowel holes 10sh into which it is inserted at both ends to create a space between adjacent segments 10s. Alternately, a spacing gasket could be provided or the adhesive itself could be thickened so that when it dries it creates a spacing gasket between the two segments as shown in FIG. 3b. The space will allow the gas to move laterally and add some turbulence to the gas flow and thereby improve the heat transfer rate in the regenerative heat-exchanger processes or mass transfer rate in the catalytic process. Further, the space will reduce the possibility of plugging by solid particles in the gas stream.

All of these other embodiments and variations are considered to fall within the scope of the present invention, which should be limited only by the scope of the following claims.

I claim:

1. A Multi-Segmented Monolith (MSM), which comprises:
    a series of longitudinally attached located segments,
    each segment extruded as a single block from raw clay,
        each segment having external non-flow surfaces and
    an inlet flow face and
    an outlet flow face which is generally parallel to and located at a distance of between 0.2 to 5 inches from the inlet flow face and
    a plurality of flow passages for the flow of a fluid therein, the flow passages extending from the inlet flow face to the outlet flow face,
    the segments being located such that the outlet of a flow passage on a segment is generally in flow communication with the inlet of a flow passage on an adjacent attached segment; and
    a dowel pin located longitudinally between the outlet and inlet faces of adjacent segments, the dowel pin attaching the adjacent segments to each other, the dowel pin further having a protrusion on it, the protrusion creating a peripheral gap between adjacent segments.

2. The MSM of claim 1, wherein the segments are extruded from raw clay without the addition of any thermal stress reducing compounds.

3. The MSM of claim 1, wherein the flow passages are identical in all attached segments.

4. The MSM of claim 1, wherein the flow passages have a polygonal flow cross-section with at least three sides.

5. The MSM of claim 1, wherein the flow passages have internal ribs.

6. The MSM of claim 1, wherein the flow passages have a U-shaped flow cross-section.

7. The MSM of claim 1, wherein the flow passages have a serpentine flow cross-section.

8. A Compound MSM (CMSM), which comprises a plurality of the MSMs of claim 1, which are attached to each other at their external non-flow surfaces with their flow passages generally oriented in the same direction.

9. The CMSM of claim 8, wherein the MSMs are attached to each other with an adhesive.

10. The CMSM of claim 9, wherein the adhesive is sodium silicate.

11. A Compound MSM (CMSM), which comprises a plurality of the MSMs of claim 1 which are bundled in a Mesh wrap with their flow passages generally oriented in the same direction.

* * * * *